United States Patent Office
2,989,543
Patented June 20, 1961

2,989,543
HALOGENATED 1-OXASPIRO[4.4]-NONA-6,8-DIENES
Sidney B. Richter and Alfred A. Levin, Chicago, Ill., assignors to Velsicol Chemical Corporation, Chicago, Ill., a corporation of Illinois
No Drawing. Filed Mar. 26, 1958, Ser. No. 723,966
13 Claims. (Cl. 260—346.1)

This invention relates to new halogenated cyclic ethers which are useful for the control of insects, fungi, and particularly for the control of mites. More specifically, this invention relates to new and novel chemical compounds of the formula

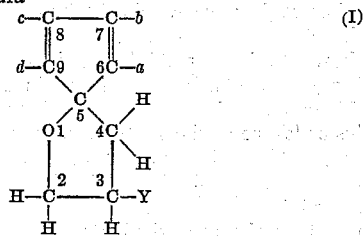

(wherein $a$, $b$, $c$, and $d$ are chlorine, bromine, or hydrogen and Y is chlorine or bromine) which contain additionally from 1 to 4 chlorine atoms on the carbon atoms in the 2, 6, 7, 8, and 9-positions, with no more than two halogen atoms on any one carbon atom and with sufficient bonds between the carbon atoms in the 6, 7, 8, and 9-position to satisfy the tetravalency of the carbon atoms.

The intermediate compounds are themselves prepared by the reaction between allyl alcohol and halogenated cyclopentadienes in the presence of an alkaline condensing agent, which takes place in a totally unexpected manner to form the hitherto unknown halogenated cyclic ethers of the structure I given above.

Treatment of I with chlorine leads to the introduction of from about 1 to 4 chlorine atoms into the molecule, depending on the reaction conditions which are chosen for the halogenation. Thus, under comparatively mild conditions with low concentrations of chlorine, short reaction time, and lack of reaction promoters such as actinic light, predominantly only one atom of chlorine is introduced into the I molecule in the 2-position. Under more stringent reaction conditions, two atoms of chlorine are introduced into the molecule, while under still more vigorous conditions, three atoms of chlorine are introduced. Ultimately, the use of the most stringent reaction conditions, such as prolonged halogenation under actinic light irradiation with increased amounts of chlorine, give rise predominantly to the introduction of about four atoms of chlorine into the I molecule. Under these conditions, two of the chlorine atoms enter at the 2-position in I, while the other two atoms enter at the 6, 7, 8, or 9-positions, with resultant removal of one of the double bonds. Prior to chlorination, $a$, $b$, $c$, and $d$ already present in I fully satisfy the tetravalency of the carbon atoms in the 6, 7, 8, and 9-positions. Thus, in order to introduce additional chlorine into the cyclopentadiene ring it is necessary that one of the double bonds be removed to provide two full bonds for the addition of chlorine. We have found that this is what occurs, for example, when 4 atoms of chlorine are introduced into 3,6,7,8,9-pentachloro-1-oxaspiro[4.4]nona-6,8-diene (equivalent to I where $a$, $b$, $c$, $d$, and Y are all chlorine). Two atoms of chlorine enter by substitution at the 2-position, as has been noted, while the remaining two atoms enter the cyclopentadiene ring by addition. Our studies have shown that this ring then becomes a cyclopentene ring to accommodate the new chlorine. In actuality, a mixture of isomers is obtained consisting predominantly of one in which the 6-position double bond is removed while the 8-position double bond is retained and a second in which a shift occurs such that the remaining double bond migrates to the 7-position. These isomers, specifically, are 2,2,3,6,6,7,8,9,9 - nonachloro - 1 - oxaspiro[4.4]non - 7-ene and 2,2,3,6,6,7,7,8,9-nonachloro-1-oxaspiro[4.4]-non-8-ene. A similar situation occurs when only 3 atoms of chlorine enter the I molecule, except that only one atom enters at the 2-position.

Compounds of the Formula I which are suitable as starting materials for the preparation of the new compositions of our invention are, for example, 3,6,7,8,9-pentachloro-1-oxaspiro[4.4]nona-6,8-diene, 3,6,7,8,9-pentabromo - 1-oxaspiro[4.4]nona-6,8-diene, 3,6,7,8-tetrachloro-1-oxaspiro[4.4]nona-6,8-diene, 6,7-dibromo-3,8,9-trichloro-1-oxaspiro[4.4]nona-6,8-diene, 7,8-dibromo-3,6,9-trichloro-1-oxaspiro[4.4]-6,8-diene, and the like. These intermediates are prepared readily, as has been noted above, by the reaction of allyl alcohol with the appropriate halogenated cyclopentadiene in the presence of an alkaline condensing agent.

The treatment of I with chlorine is carried out in the presence of an inert solvent or diluent. Although a chlorinated hydrocarbon solvent such as carbon tetrachloride is preferred for carrying out the halogenation, other aromatic, aliphatic, or heterocyclic compounds can be used. The temperature at which the halogenation is carried out is not critical, although temperatures between about room temperature and the reflux temperature of the solvent or diluent employed are preferred. A most preferred temperature range is between about normal room temperature and about 100° C.

The following examples illustrate the manner in which the new compositions of our invention are prepared.

EXAMPLE 1

Chlorination of 3,6,7,8,9 - pentachloro-1-oxaspiro[4.4]-nona-6,8-diene 3,6,7,8,9 - pentachloro - 1 - oxaspiro[4.4]nona - 6,8-diene was prepared by the reaction of allyl alcohol with hexachlorocyclopentadiene in the presence of potassium hydroxide.

The crystalline product (136 g.; 0.46 mole) was dissolved in 500 cc. of carbon tetrachloride and placed in a 1-liter, 3-necked, round-bottomed flask fitted with a water-cooled reflux condenser, a mechanical stirrer, a thermometer immersed in the reaction mixture, and a gas inlet tube with a sparger outlet placed below the liquid surface. The reaction mixture was stirred and heated to a temperature of 65° C., whereupon gaseous chlorine was passed into the mixture over a period of 8 hours. At the end of this time, the chlorination was stopped, and the carbon tetrachloride was distilled off. The residue was then distilled in vacuo to give 20.4 g. (30% yield based on the starting material utilized) of 2,3,6,7,8,9 - hexachloro - 1 - oxaspiro[4.4]nona - 6,8-diene boiling at 121 to 127° C. under 0.7 mm. pressure and having an index of refraction (D line) of 1.5600 at 24° C. The introduction of only 1 atom of chlorine into the starting material molecule was confirmed by analysis $C_8H_4Cl_6O$: Calculated: C, 29.22; H, 1.22; Cl, 65.19. Found: C, 29.53; H, 1.60; Cl, 65.85.

EXAMPLE 2

Chlorination of 3,6,7,8,9-pentabromo-1-oxaspiro[4.4]nona-6,8-diene 3,6,7,8,9-pentabromo-1-oxaspiro[4.4]nona-6,8-diene is prepared by the reaction of allyl alcohol with hexabromocyclopentadiene in the presence of potassium hydroxide.

The product (516.7 g.; 1 mole) is mixed with 1000 cc. of carbon tetrachloride in a 2-liter flask fitted as described in Example 1. The mixture is stirred and heated to reflux while gaseous chlorine is passed into the mixture until the increase in weight of the reaction mixture is 68.9 g. The chlorination is then stopped, and the carbon tetrachloride is distilled off. The residue is then distilled in vacuo to give the desired 2,2-dichloro-3,6,7,8,9 - pentabromo - 1 - oxaspiro[4.4]nona - 6,8-diene.

EXAMPLE 3

*Chlorination of 3,6,7,8-tetrachloro-1-oxaspiro[4.4]nona-6,8-diene*

3,6,7,8 - tetrachloro - 1 - oxaspiro[4.4]nona - 6,8-diene is prepared by the reaction of allyl alcohol with 1,2,3,5,5-pentachlorocyclopentadiene, which is obtained from tetrachlorocyclopentadiene as described by R. K. Meyers (Purdue University Ph. D. Thesis, February 1950, pp. 40, 45–8).

The product (260 g.; 1 mole) is treated with chlorine as described in Example 2, until the increase in weight is 68.9 g., and the reaction product is fractionated to separate the desired 2,2,3,6,7,8-hexachloro-1-oxaspiro-[4.4]nona-6,8-diene.

EXAMPLE 4

*Introduction of four atoms of chlorine into 3,6,7,8,9-pentachloro-1-oxaspiro[4.4]nona-6,8-diene*

3,6,7,8,9 - pentachloro - 1 - oxaspiro[4.4]nona - 6,8-diene (200 g.) was dissolved in 300 cc. of carbon tetrachloride and placed in a 500 cc. chlorination tube. The tube was wrapped in heating tape in a manner so as to permit maximum penetration of light and was illuminated by 2 Westinghouse 15-watt "Blue lamps" each placed 2 inches from the chlorination tube. The liquid was heated to a temperature of 45° C., and gaseous chlorine was passed into the tube over a period of 14 hours. At the end of this time the chlorination was stopped, and the carbon tetrachloride was distilled off. The residue was subjected to distillation in vacuo. After a small forerun of unreacted starting material which distilled at 117 to 120° under 0.4 mm. pressure, 184 g. of product (62% yield based on starting material utilized) distilled at 160 to 162° C. under 0.4 mm. pressure as a viscous oil (index of refraction, D line, of 1.5880 at 25° C.) which solidified on standing. Recrystallization of the solid from pentane gave crystals, melting point 68 to 70° C., of the compound $C_8H_3Cl_9O$ as a mixture of isomers consisting of 2,2,3,6,6,7,8,9,9-nonachloro-1-oxaspiro[4.4]non-7-ene and 2,2,3,6,6,7,7,8,9-nonachloro-1-oxaspiro[4.4]non-8-ene.

*Analysis.*—$C_8H_3Cl_9O$.—Calculated: C, 22.13; H, 0.70; Cl, 73.49. Found: C, 22.35; H, 0.84; Cl, 73.20.

EXAMPLE 5

*Introduction of three atoms of chlorine into 3,6,7,8,9-pentachloro-1-oxaspiro[4.4]nona-6,8-diene*

In a manner similar to that described in Example 4, 3,6,7,8,9 - pentachloro - 1 - oxiaspiro[4.4]nona-6,8-diene (294 g.; 1 mole) is treated with gaseous chlorine until the weight increase of the reaction mixture is 105 g. At the end of this time, the chlorination is stopped, and the solvent is distilled off. The residue is fractionated in vacuo to give the desired compound $C_8H_4Cl_8O$.

The above examples illustrate the manner in which compounds of the structure I, in which, 1, 2, 3, or 4 atoms of chlorine have been introduced additionally into the molecule, are prepared and isolated. In these examples it is shown how the compound which is formed predominantly in good yield under the given reaction conditions in each case is isolated. The actual crude products from the halogenation reactions consist of the compound which is formed predominantly in admixture with smaller amounts of lesser or more halogenated compounds. Thus, while the major product which is formed in the halogenation described in Example 4 is the nonachloro compound, smaller amounts of lower chlorinated products are also present in the crude reaction product. While we have shown specifically how to isolate and identify the desired nonachloro compound, in commercial practice this isolation is not absolutely essential. Compounds of the structure I which contain additionally from about 1 to 4 atoms of chlorine are active pesticides, and their mixtures as produced by the halogenation reaction are commercially useful pesticides.

Experiments were carried out which indicate that the new compounds of our invention are useful for the control of a variety of economically important pests. For example, the compound prepared in Example 1, namely 2,3,6,7,8,9 - hexachloro - 1 - oxaspiro[4.4]nona - 6,8-diene, was formulated as a 10% wettable powder, which was dispersed in water to give a concentration of 0.1% actual chemical. When cranberry bean plants heavily infested with adults of the two-spotted spider mite (*Tetranychus telarius*) were dipped into this suspension and then removed for observation, complete mortality of the mites took place within 72 hours, while no damage to the plants was observed. Similarly, this compound was shown to have good insecticidal activity. When cranberry bean plants were dipped in a 0.2% suspension of this compound and were then dried and caged with 3rd-instar larvae of the southern armyworm (*Prodenia eridania*) 90% of the larvae were dead within 48 hours after treatment. While 100% feeding on the plants was observed in an untreated control, only 10% feeding was noted on the treated plants.

Further, the 2,3,6,7,8,9 - hexachloro - 1 - oxaspiro[4.4] nona-6,8-diene was also shown to be an active fungicide by the slide germination technique adopted by the Committee on Standardization of Fungicidal Tests of the American Phytopathological Society. Measured concentrations of spores (conidia stage) of *Fusarium roseum*, which causes seedling blight and head scab of cereals and grasses, fusarium rot in muskmelon and pumpkin, stem rot in asters, and other plant diseases, were placed on glass slides in contact with a concentration of 100 p.p.m. of the test compound. After 24 hours' incubation at 72° F., the percent spore germination of this species was zero. Similar results at this concentration were observed in tests with spores of *Monilinia fructicola*, the brown rot fungus which causes extensive damage to commercial fruits. Even at concentrations as low as 10 p.p.m., only 9 to 12 percent spore germination was observed in this species.

Similarly, the more extensively halogenated compounds of our invention have also been shown to be active pesticides. For example, the nonachloro compound prepared as described in Example 4 was used as a dip for cranberry bean plants infested with adults of the two-spotted spider mite. Complete mortality of the mites 72 hours after treatment was observed at a concentration of 0.2% of this compound. This same substance was also active in reducing the spore germination of both *F. roseum* and *M. fructicola*.

These new compositions of our invention can be utilized in all the typical ways that other pesticides are used, such as, for example, in dusts, oil sprays, aerosols, water emulsions, etc., and can be applied by any means calculated to utilize their pesticidal properties.

We claim:
1. A compound of the formula selected from the group consisting of

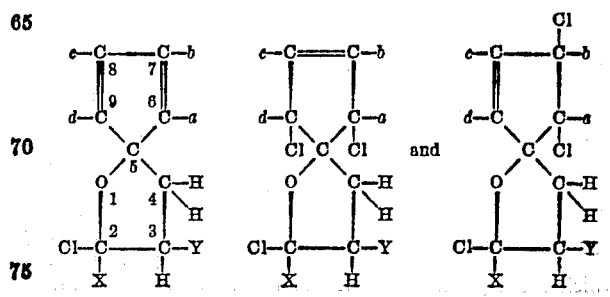

wherein $a$, $b$, $c$, and $d$ are selected from the group consisting of chlorine, bromine, and hydrogen, Y is selected from the group consisting of chlorine and bromine, and X is selected from the group consisting of chlorine and hydrogen.

2. 2,3,6,7,8,9 - hexachloro - 1 - oxaspiro - [4.4]nona-6,8-diene.

3. 2,2,3,6,6,7,8,9,9 - nonachloro - 1 - oxaspiro - [4.4]-non-7-ene.

4. 2,2,3,6,7,8 - hexachloro - 1 - oxaspiro[4.4] - nona-6,8-diene.

5. 2,3,6,6,7,7,8,9 - octachloro - 1 - oxaspiro - [4.4]non-8-ene.

6. The process which comprises reacting a compound of the formula

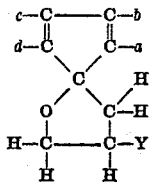

wherein $a$, $b$, $c$, and $d$ are selected from the group consisting of chlorine, bromine, and hydrogen and Y is selected from the group consisting of chlorine and bromine, with chlorine in the presence of an inert solvent at a temperature between about room temperature and about the reflux temperature of said solvent until from 1 to 4 atoms of chlorine are introduced.

7. The process of claim 6, said process being carried out in a chlorinated hydrocarbon solvent at a temperature between about room temperature and about 100° C.

8. The process of claim 6, said process being carried out in the presence of actinic light.

9. The process of claim 6, wherein $a$, $b$, $c$, $d$, and Y are chlorine, and wherein 1 atom of chlorine is introduced into said diene compound.

10. The process of claim 6, wherein $a$, $b$, $c$, $d$, and Y are chlorine, and wherein 2 atoms of chlorine are introduced into said diene compound.

11. The process of claim 6, wherein $a$, $b$, $c$, $d$, and Y are chlorine, and wherein 3 atoms of chlorine are introduced into said diene compound.

12. The process of claim 6, wherein $a$, $b$, $c$, $d$, and Y are chlorine, and wherein 4 atoms of chlorine are introduced into said diene compound.

13. 2,2,3,6,6,7,8,9 - nonachloro - 1 - oxaspiro - [4.4]-non-8-ene.

No references cited.